(12) United States Patent
Cook

(10) Patent No.: US 7,373,811 B1
(45) Date of Patent: May 20, 2008

(54) TIRE FILLER WITH PRESSURE INDICATOR

(76) Inventor: Ronald D. Cook, 4142 Highland Pl., Riverside, CA (US) 92506

( * ) Notice: Subject to any disclaimer, the term of this patent is extended or adjusted under 35 U.S.C. 154(b) by 0 days.

(21) Appl. No.: 11/588,901

(22) Filed: Oct. 28, 2006

(51) Int. Cl.
*B60C 23/02* (2006.01)

(52) U.S. Cl. ............................ 73/146.8

(58) Field of Classification Search ........... 73/146.8, 73/146.2, 146.5, 715; 137/224, 225
See application file for complete search history.

(56) References Cited

U.S. PATENT DOCUMENTS

| | | | |
|---|---|---|---|
| 1,079,704 A | 11/1913 | Hathaway | |
| 3,230,968 A | 1/1966 | Struby | |
| 3,670,688 A | 6/1972 | Seaberg | |
| 3,789,867 A | 2/1974 | Yabor | |
| 3,906,988 A | 9/1975 | Mottram | |
| 4,606,391 A | 8/1986 | Achterholt | |
| 4,901,747 A | 2/1990 | Yabor | |
| 5,014,643 A | 5/1991 | Huang | |
| 5,027,740 A | 7/1991 | Kramer et al. | |
| 5,503,012 A | 4/1996 | Rabizadeh | |
| 5,886,254 A | 3/1999 | Chi | |
| 5,979,232 A | 11/1999 | Halcomb | |
| 6,055,925 A | 5/2000 | Horton | |
| 6,293,297 B1 | 9/2001 | Maldonado et al. | |
| 6,374,666 B1* | 4/2002 | Lemberger et al. | ........ 73/146.8 |
| 6,782,740 B2* | 8/2004 | Wallach | ........... 73/146 |
| 7,273,082 B2* | 9/2007 | White et al. | ........... 152/417 |
| 2003/0079539 A1* | 5/2003 | Hsu | ........... 73/146.8 |
| 2003/0192371 A1* | 10/2003 | Cousineau | ........... 73/146 |
| 2004/0011123 A1* | 1/2004 | Rutherford | ........... 73/146 |
| 2005/0194080 A1* | 9/2005 | White et al. | ........... 152/417 |

\* cited by examiner

*Primary Examiner*—Jewel Thompson
(74) *Attorney, Agent, or Firm*—Kirk A. Buhler; Buhler & Associates

(57) ABSTRACT

A combination valve stem extension hose and pressure indicator is disclosed. The extension is threaded onto a standard valve stem. The extension tube is available in a variety of lengths to accommodate filling inside dually tires. The extension tube also is available with various bend angles. A pressure indicating piston is provided to give visual status of the pressure within the tire in a static filled condition and while air is being added to the tire. The construction of the pressure indicator allows for threading or welding of the sight glass. Improvements in the pressure indicator include locating, aligning and positioning features to improve operation and longevity of the gauge.

17 Claims, 4 Drawing Sheets

TIRE FILLER WITH PRESSURE INDICATOR

FIELD OF THE INVENTION

This invention relates to improvements in a combination tire fill tube with a pressure indicator. More particularly, the present device is a hose, tube or extension that connects to an existing tire filling stem where the hose, tube or extension includes a pressure indicating piston that provides the visual status of the pressure within the tire.

BACKGROUND OF THE INVENTION

The amount of air pressure in an automobile tire is important for a number of reasons. If the air pressure is too low the friction of the tire on the ground is increased, resulting in lower gas mileage. This increased friction produces more heat from the tire rolling on the ground and can cause the tire to disassemble. If the pressure is too high it is possible for the tire to explode and cause injury. In the case of pressure being outside of an optimal range the tire will not wear evenly resulting in a shortening of the expected life of the tire. Ideally tire pressure should be checked when gas is being added to the vehicle but this is not always the case. While this is an ideal situation, the pressure in most tires are only checked when the oil is being changed.

Part of the reason for people not checking the pressure in their tires on a regular basis is the difficulty involved in locating a tire pressure gauge, removing the cap on each tire, checking the pressure and re-installing the cap. To eliminate the problem associated with using a pressure gauge to check the pressure on a tire several devices have been patented that provide for a valve cap or cover with an integrated pressure indicator. While this has made it easier to visually check the pressure in each tire, the pressure indicator needs to be removed to add air to the tire, and the filled pressure is then determined after replacing the valve cover. A simpler solution is to provide a tire stem or tire stem extension with an integrated pressure indicator. Some patents have been issued on combination valve stem and valve stem adapters with integrated pressure indicators. The bulk of these devices have the pressure indicator existing concentric with the fill line. While these provide the function, their construction is complex and the indicator window is not always placed in an ideal location for viewing.

Examples of patents that show or describe this type of configuration are with U.S. Pat. No. 6,293,297 issued on Sep. 25, 2001 to Maldonado et al. and U.S. Pat. No. 4,901,747 issue on Feb. 20, 1990 to Enrique M. Yabor. In Maldonado the device threads into an existing valve stem and in Yabor the device is a valve stem. Both of these patents show and describe a device where the indicator is concentric with the fill line. These devices are not made with a branch from the filler line making alterations to the construction possible. The branch allows the filler line to be constructed at various angles and with various lengths to optimize the device based upon the vehicle the device will be placed into. Other patents have been issued where the fill line and the indicator is not concentric. Some exemplary examples of these patents are described herein.

U.S. Pat. No. 5,979,232 issued Nov. 9, 1999 to Halcomb discloses a tire pressure filler with a gauge where the pressure indicator is located in a parallel relationship to the fill valve. In this patent the filler screws onto a standard tire valve stem, but the filler is a different size from the valve stem. It is further possible for the filler port to exist in a location that blocks the view of the sighting hole. This device is further not intended to be used as a valve stem, and the length of the device is fixed thereby reducing installation options.

U.S. Pat. No. 5,503,012 issued Apr. 2, 1996 to Masoud Rabizadah discloses a combination filler and pressure indicator where the indicator gauge is located along side the filler port. In this patent the indicator is a ball that moves within a sight glass. The device is further configured as a valve stem. While this patent discloses the basic components, it is not configurable to different lengths, it is installable in a condition where the sight glass is not visible, and is not usable where multiple or dually tire are mounted.

Various other improvements have been made to improve the overall operation of the tire filler and pressure indicator that include internal features that are part of the pressure indicator. These features further improve the manufacturability of the apparatus and most if not all of these features are not claimed or described in the prior art.

What is needed is a tire filler with an integrated pressure indicator that is manufacturable to various lengths with improved design and construction features that allow it to be made in a cost effective and configurable manner. The proposed application provides these features and is described in detail herein.

BRIEF SUMMARY OF THE INVENTION

It is an object of the tire filler with pressure indicator to provide a tire fill line in the form of an extension or tire stem that is always in a pressurized condition. This allows the person filling the tire to immediately know when the correct amount of air is in the tire. The versatility of the design allows for a variety of options for the length and the angle of the fill line to be altered to accommodate locating the device on a wide variety of tires and vehicles.

It is another object of the tire filler with pressure indicator to provide a tire fill line where the pressure indicator is located along the length of the valve stem or extension pipe. The sensor is located in an orientation that is perpendicular or laterally away from the body of the air line. Because the indicator is located distal from the filling connection there are more design options for variability. The variability provides for optimizing the location of the indicator in the tire to position it for the best viewing from the exterior of the vehicle.

It is another object of the tire filler with pressure indicator to provide a tire fill line to provide the device with a simple good and bad pressure indicator. This type of indicator allows a person to easily determine the status without the need to remember or look-up the correct fill pressure for a tire. The safe status of the tires is visual determined by a quick walk around a vehicle and can easily be determine while one is adding fuel to a vehicle. Appropriate adjustment is made by removing the cap and adding or removing pressure from the stem.

It is another object of the tire filler with pressure indicator to provide a tire fill line where integrated into the pressure indicator a keeper is located around the expansion diaphragm to limit expansion of the diaphragm while it is under pressure. Without the keeper the diaphragm can over expand and rupture.

It is another object of the tire filler with pressure indicator to provide a tire fill line where integrated within the pressure indicator a nipple protrudes from the diaphragm to locate the indicator piston. The locating of the piston ensures that the piston and the indicator ring is pushed linearly within the sight glass to prevent tipping that can bind the piston and or indicator ring resulting in an inaccurate status for the pressure.

It is another object of the tire filler with pressure indicator to provide a tire fill line to integrate sonic welding, spin welding, threaded or bayonet type assembly methods to provide leak proof connections in a cost effective product. Depending upon the assembly method the design of the various internal components is made to accommodate the process.

It is still another object of the tire filler with pressure indicator to provide a tire fill line where the tube has a valve located in the filing end to maintain pressure within the device. When the device is configured as an extension line, a stub is located in the end that screws into the valve stem to depress the valve in the tire allowing the extension to always remain under pressure.

Various objects, features, aspects, and advantages of the present invention will become more apparent from the following detailed description of preferred embodiments of the invention, along with the accompanying drawings in which like numerals represent like components.

DETAILED DESCRIPTION

Figure 1A:
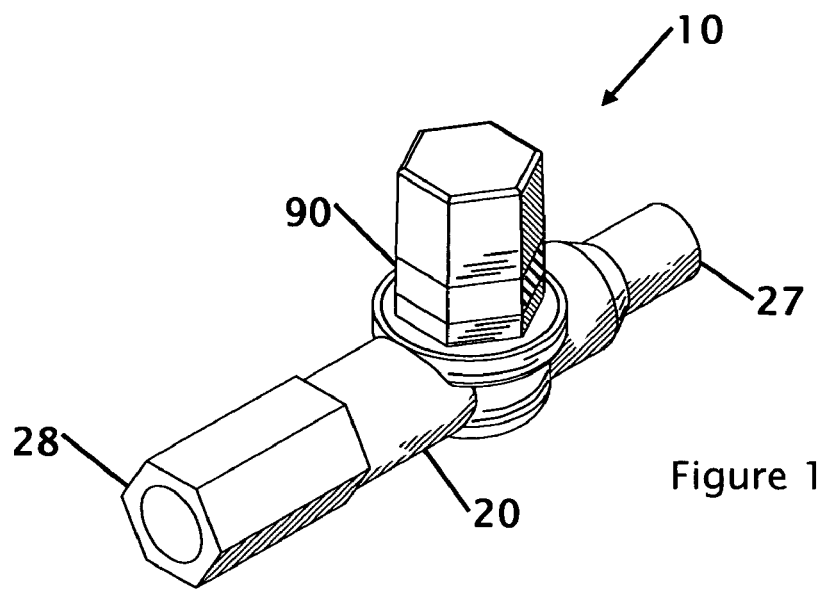
FIG. 1A shows an isometric view of the combination tire filler and pressure indicator in one preferred embodiment.
Figure 1B:
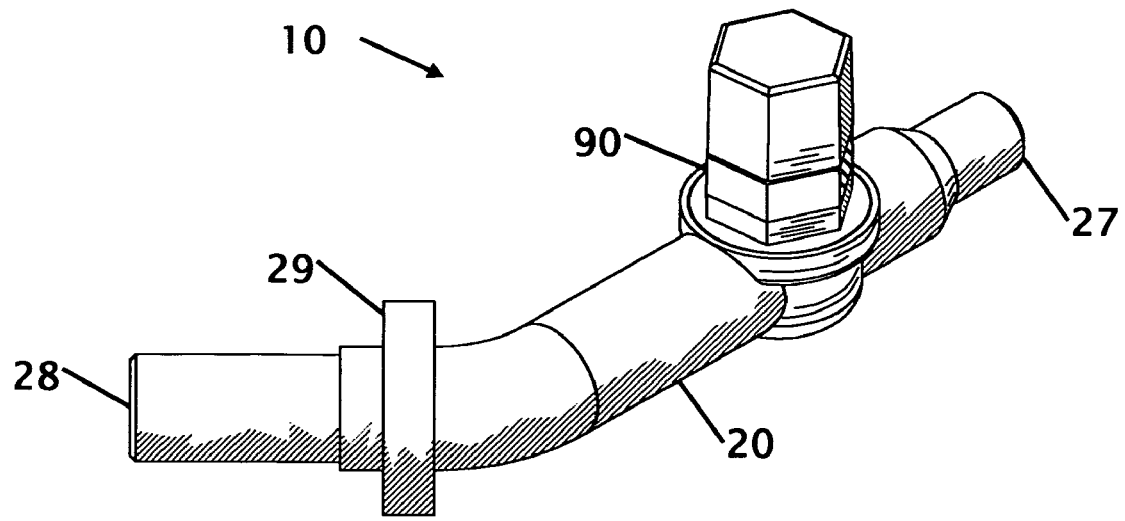
FIG. 1B shows an isometric view of the combination tire filler and pressure indicator in a second preferred embodiment.

FIG. 1A shows an isometric view of the combination tire filler and pressure indicator 10 in one preferred embodiment with a straight filler extension. FIG. 1B shows an isometric view of the combination tire filler and pressure indicator in a second preferred embodiment configured as a tire stem with a bent end. The embodiment shown in FIG. 1B is configured for placement in the rim of a vehicle tire where the expanded shoulder 29 seats on the outside of the rim of a vehicle and a nut or similar fastener are threaded onto the input side 28 of the housing 20. A gasket completes the seal. A tire is then mounted onto the rim and an air line is attached to the input side 27 of the device where the air fills the tire. When sufficient air has filled the tire the pressure indicator will move within the window 90 to indicate that the tire is sufficiently full of air. It should be noted that the embodiment shown and described in FIG. 1 is for use as a tire stem, but other embodiments where the device is used as an extension tube are also shown and described. The sight glass and body of the pressure indicator is shown as an octagonal shape to allow for easier gripping of the body during the assembly process of the pressure gauge onto the filler pipe. The octagonal shape is preferred because it can be gripped with common socket tools, but other shapes are contemplate that will provide similar gripping characteristics.

Figure 2:
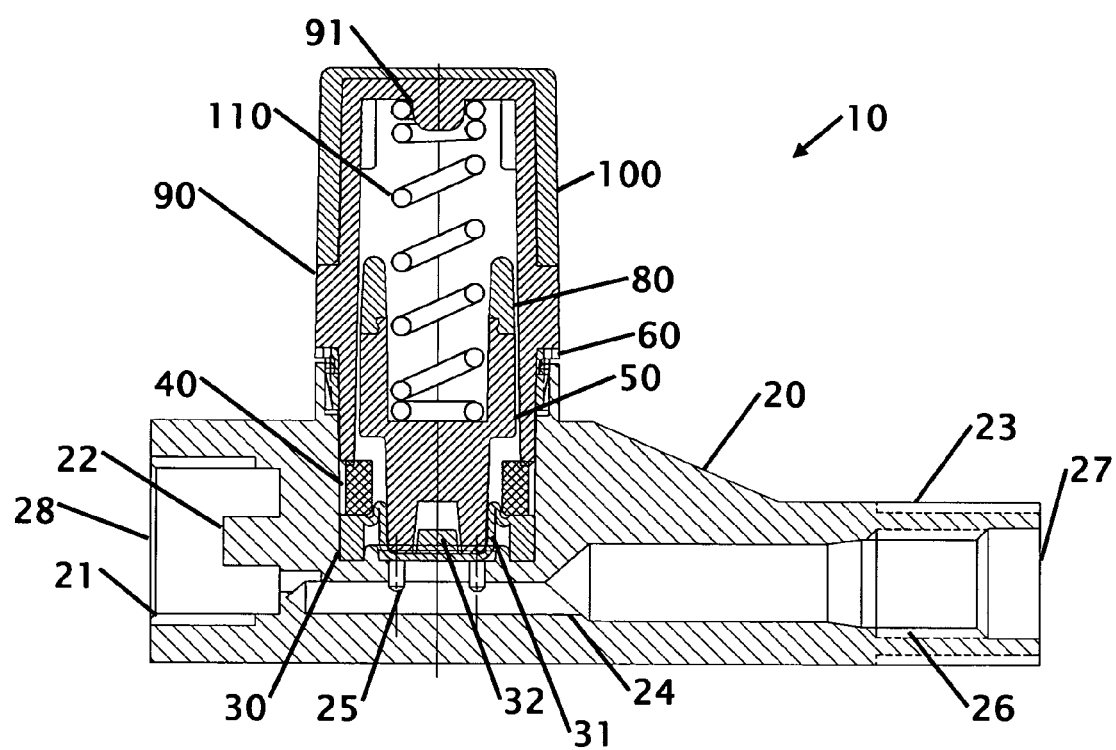
FIG. 2 shows a cross sectional view of the combination tire filler and pressure indicator from the FIG. 1A preferred embodiment.
Figure 4:
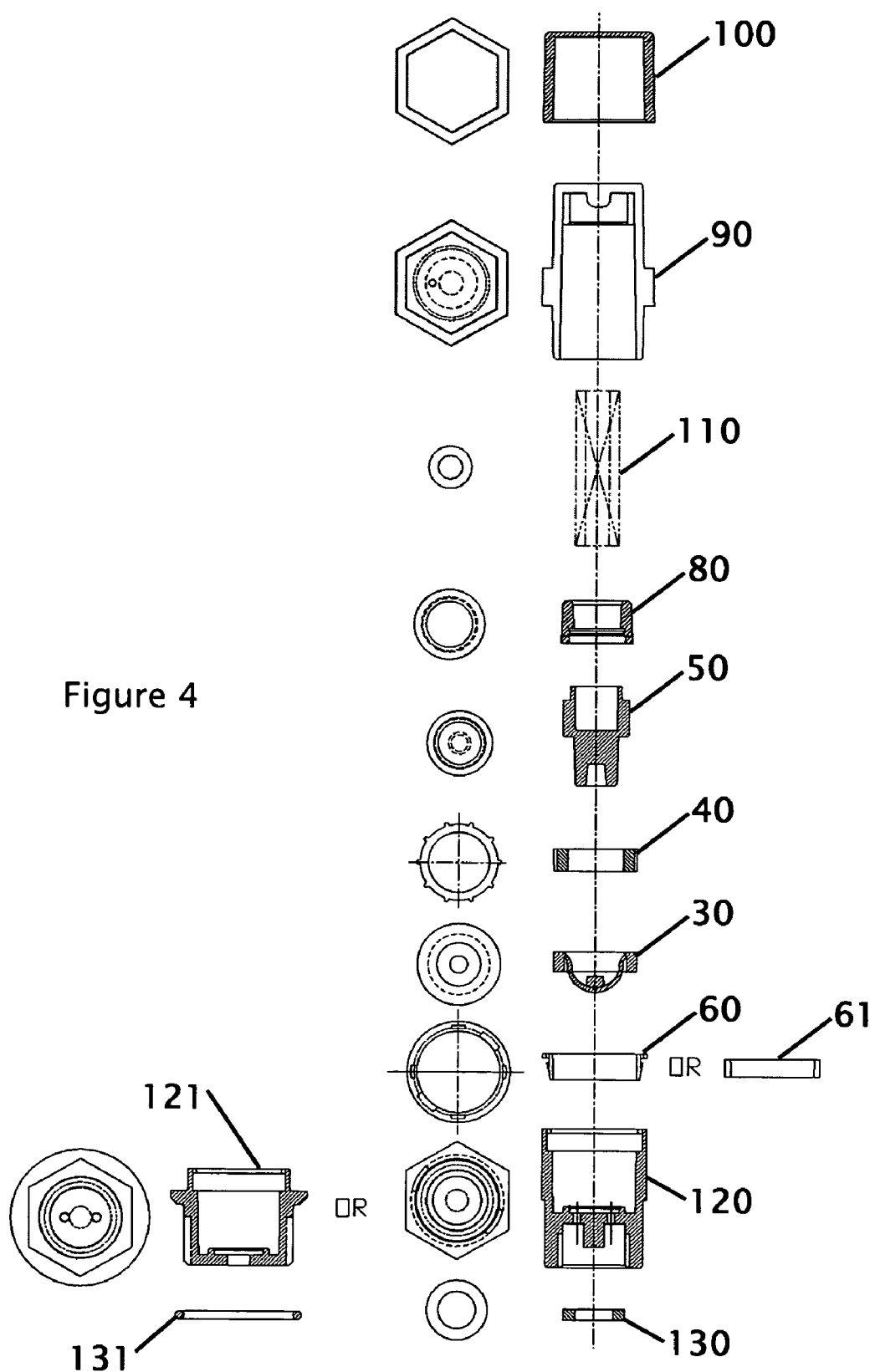
FIG. 4 shows an exploded view of the pressure indicator and tire filler showing the individual components with contemplated optional assembly methods.

FIG. 2 shows a cross sectional view of the combination tire filler and pressure indicator 10 in the preferred embodiment from FIG. 1A. This figure shows the complete assembly and FIG. 4 shows an exploded view of the pressure indicator and tire filler 10 showing the individual components with contemplated optional assembly methods. FIG. 4 shows both a cross section of each part and a top view each part. The top view is located adjacent to each cross sectional view.

In FIG. 1A the embodiment is a shortened version configured as an expansion tube where the body of the pressure sensor extends perpendicularly or laterally from the housing 20. The housing 20 is shown in a slightly tapered configuration to allow for standard filler input connections. In operation the cap on the valve stem is removed and the device is threaded onto the valve stem at 28 with internal threads 21. As the device is threaded onto the valve stem a nipple 22 depresses the valve located within the existing valve stem to allow the existing valve stem to remain open. A valve is threaded 26 into the other end 27 of the device. The valve allows the device and the pressure sensor to both be pressurized at all times to continuously indicate the pressure in the tire. Threads 23 are located on the outside of end 27 to allow for placement of the cap that was removed from the original stem. Various air passages are formed through the filler tube 24 to allow for an open passage through the filler tube. Vertical air passage tube(s) 25 allow air to pass into the pressure sensor onto an expandable diaphragm 30.

As air fills into the filling tube, the air pressure on the diaphragm increases and pushes the piston 50 to overcome the force from spring 110. The material and winding of the spring 110 is variable based upon the desired pressure indicating range of the gauge. The diaphragm in this figure is shown in the compressed configuration. The ends of the diaphragm 30 are seated on housing 20 and the folded sides 31 of the diaphragm are wrapped between expansion keeper ring 40 and the piston 50. A nipple 32 exists to locate the end of the piston 50 and help guide the piston so it remains concentric with the sight glass 90.

The keeper ring 40 provides the function of preventing the diaphragm from over expanding if the tire is filled with excessive pressure. In operation, as the diaphragm expands it will push harder on the side walls of the body of the gauge and can expand to a point where it can rupture allowing air from within the tire to bleed out of the gauge. The diaphragm pushes in the bottom of the piston to overcome spring force 110. As the spring force is overcome, the piston 50 will be lifted within the viewing glass 90 where the indicator becomes visible. In the ideal pressure setting the indicator shows green. If the tire looses about 10% of its air pressure the lower (red) portion of the piston will show in the middle of the viewing glass region. Because the pressure indicator and the viewing glass are both circular the status of the pressure within the tire can be viewed from nearly any angle or tire position. In the preferred embodiment the upper portion of the piston is red and the lower portion of the piston is green, but it is contemplated that multiple rings of different color could be utilized or numerical values could be used to show the pressurized status of the tire. The single indicator ring is preferred because a user does not need to remember what each color means, and it is easier to see and determine the status of one ring rather than a plurality of rings. In the embodiment shown the piston 50 is one color, the piston cap 80 is a different color.

A seal 60, as shown in FIG. 2, or seals 60 or 61, as shown in FIG. 4, provide for a leak proof connection of the sight glass to the body of the filler tube.

In one contemplated embodiment the sight glass is screwed into the lower body or filler tube. In another contemplated embodiment the sight glass is ultrasonically welded onto the lower body or filler tube. In still another contemplated embodiment the sight glass is spun welded onto the lower body or filler tube. The configuration for each of the attachment methods and the associated lower bodies are shown as items 120 or 121 in FIG. 4 and with cross sectional views 3A-3C. The seals 60 or 61 from FIG. 4 also are variable based upon the manufacturing process used.

Refer to FIG. 4 to see some design optional components, that are namely the seals 60, 61 and the lower body 120, 121. Lower body 121 is a valve body that is screwed into the valve stem. Seal 130 is a seal to screw the lower plastic body into the flow through and seal 131 is a seal between the valve stem and the valve body. Not all these components will be used in all configurations. It is contemplated that the filler tube can be constructed from metal or molded from a plastic material. If the filler tube is made or machined from metal the gauge is screwed into the metal filler tube. If the filler tube is molded from plastic the gauge can be threaded, ultrasonically welded, spun welded or bonded together. The mechanical shape and material of the space element 61 is variable based upon the method of joining the lens to the lower body of the gauge portion. Two different shapes of lower bodies 120 and 121 are shown based upon the material and construction method of the gauge and filler tube. Cross section FIGS. 3A and 3B use the lower body 121 and cross section FIG. 3C uses the lower body 120. The sealing gaskets 130 and 131 are varied based upon the lower body. If the lower body is threaded into the filler tube a simple elastomeric gasket 131 is used to seal the lower body into the filler tube. If all plastic parts spacer 60 is used and spin welded to bond the two components.

Figure 3A:
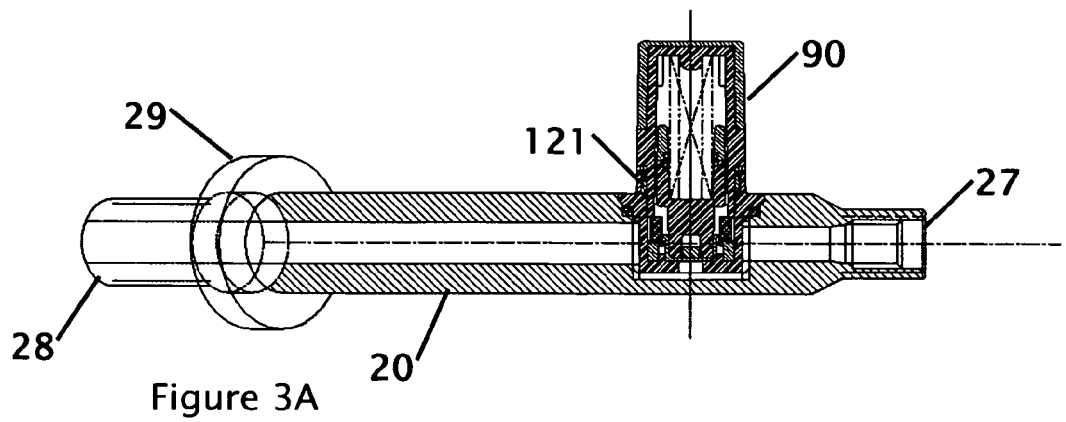
FIG. 3A shows a cross sectional view of the combination tire filler and pressure indicator shown in FIG. 1
Figure 3B:
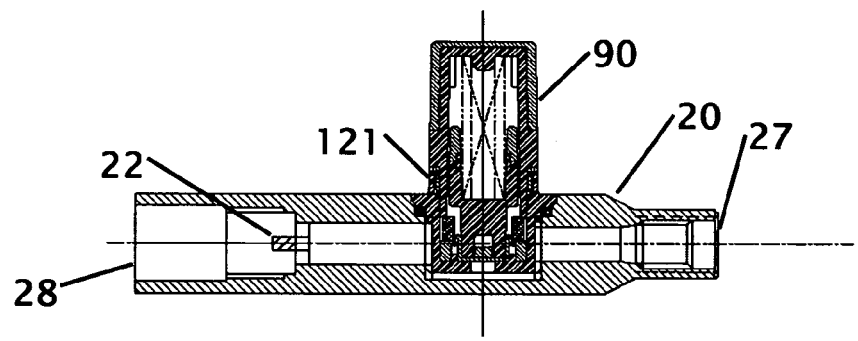
FIG. 3B shows a cross sectional view of the combination tire filler and pressure indicator in a third preferred embodiment
Figure 3C:
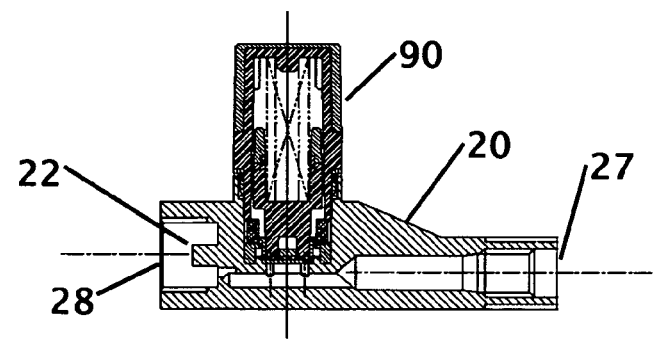
FIG. 3C shows a cross sectional view of the combination tire filler and pressure indicator from FIG. 2.

FIGS. 3A-3C show cross sectional views of the combination tire filler and pressure indicator shown in FIG. 1. 3A is a bent filler tire stem where end 28 is threaded. The shoulder 29 is placed in the rim and elastomeric washers are placed on both sides of the rim. A nut is threaded onto the end of the stem at 28 to hold and seal the stem.

FIG. 3B shows a cross sectional view of the combination tire filler and pressure indicator in another preferred embodiment where the device is an elongated extension. FIG. 3C shows a cross sectional view of the combination tire filler and pressure indicator from FIG. 2 as a shortened extension. The housing 20 is the filler sections and is configurable in variable lengths, and with variable bend angles to satisfy preferred or ideal placement of the sight glass. When the device is configured as an extension tube, a nipple 22 is located within the filler tube section 28 to depress the valve that is located within the existing stem. A secondary valve is threaded into the air input side 27 of the device. The sight glass allows a user to quickly determine the status of the air pressure within each tire. Two different shapes of lower bodies 120 and 121 are used based upon the material and construction method of the gauge and filler tube. Cross section FIGS. 3A and 3B use the lower body 121 and cross section FIG. 3C uses the flow through housing 20.

Thus, specific embodiments of a tire filler with a pressure indicator have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. A combination tire filler hose and pressure indicator comprising:
   an elongated housing having an internal filler tube for the passage of air between each end of the elongated housing;
   a first end configured with an internal thread configured for fitting on a valve stem, and further includes a nipple that depresses a valve within the valve stem;
   a second end configured with an external thread configured for a cap;
   a pressure indicator extending perpendicular or laterally away from the housing wherein the elongated housing is configurable in different lengths and bends to allow for placement of the pressure indicator along the length of the housing.

2. The combination tire filler hose and pressure indicator from claim 1 wherein the pressure indicator is spin welded, or ultrasonically welded into the elongated housing.

3. The combination tire filler hose and pressure indicator from claim 1 wherein air can be added to the second end for altering the pressure within a tire that is attached to the first end without requiring removal of the pressure indicator.

4. The combination tire filler hose and pressure indicator from claim 1 wherein the housing is threadable directly onto the air filling stem of a vehicle tire.

5. The combination tire filler hose and pressure indicator according to claim 2 wherein the pressure indicator has an internal diaphragm with an integrated nipple that locates and aligns an indicating piston.

6. The combination tire filler hose and pressure indicator according to claim 2 that further includes an internal keeper ring located at least partially around the diaphragm to prevent over expansion of the diaphragm.

7. The combination tire filler hose and pressure indicator according to claim 2 wherein the elongated filling line is configurable in different lengths and bends to allow for placement along the length of the filler line.

8. A combination tire filler hose and pressure indicator comprising:
   an elongated housing having an internal filler tube for the passage of air between each end of the elongated housing;
   a first end configured with an internal thread configured for fitting on a valve stem, and further includes a nipple that depresses a valve within the valve stem;
   a second end configured with an external thread configured for a cap;
   a pressure indicator mounted on the elongated filling line, and
   the pressure indicator has an expanding diaphragm with a nipple to locate & align the indicating piston.

9. The combination tire filler hose and pressure indicator according to claim 8 that further includes an internal keeper ring located at least partially around the diaphragm to prevent over expansion of the diaphragm.

10. The combination tire filler hose and pressure indicator according to claim 8 wherein the elongated filling line is configurable in different lengths and bends to allow for placement along the length of the filler line.

11. The combination tire filler hose and pressure indicator according to claim 8 wherein the housing is threadable directly onto the air filling stem of a vehicle tire.

12. The combination tire filler hose and pressure indicator according to claim 8 wherein the pressure indicator is spin welded or ultrasonically welded into the elongated tire filling line.

13. A combination tire filler hose and pressure indicator comprising:
- an elongated housing having an internal filler tube for the passage of air between each end of the elongated housing;
- a first end configured with an internal thread configured for fitting on a valve stem, and further includes a nipple that depresses a valve within the valve stem;
- a second end configured with an external thread configured for a cap;
- a pressure indicator mounted on the elongated filling line, and
- the pressure indicator has an internal keeper ring that prevents over expansion of the diaphragm from over expanding.

14. The combination tire filler hose and pressure indicator according to claim 13 that further includes an internal diaphragm with an integrated nipple that locates and aligns an indicating piston.

15. The combination tire filler hose and pressure indicator according to claim 13 wherein the elongated filling line is configurable in different lengths and bends to allow for placement along the length of the filler line.

16. The combination tire filler hose and pressure indicator according to claim 13 wherein the housing is threadable directly onto the air filling stem of a vehicle tire.

17. The combination tire filler hose and pressure indicator according to claim 13 wherein the pressure indicator is spin welded or ultrasonically welded into the elongated tire filling line.

\* \* \* \* \*